Figure 1:
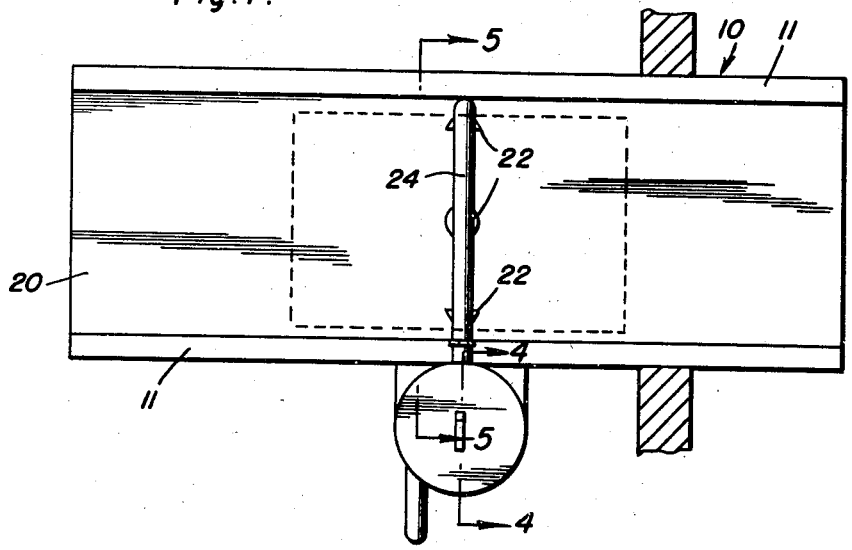

Aug. 30, 1949.　　　　A. PAUL, JR　　　　2,480,601
LIVESTOCK DUSTING APPARATUS
Filed Jan. 5, 1948　　　　3 Sheets-Sheet 1

Alfred Paul, Jr.
INVENTOR.

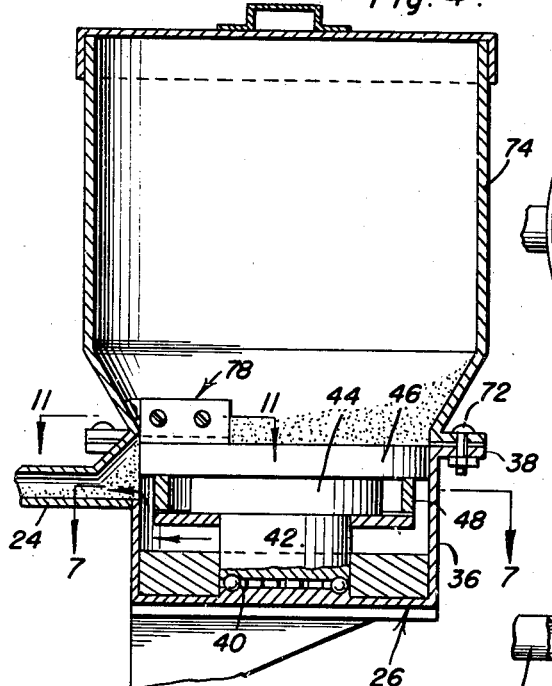
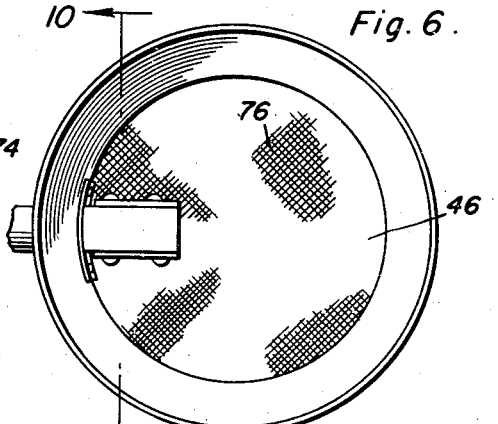
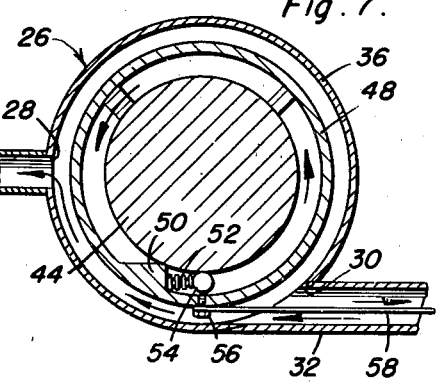
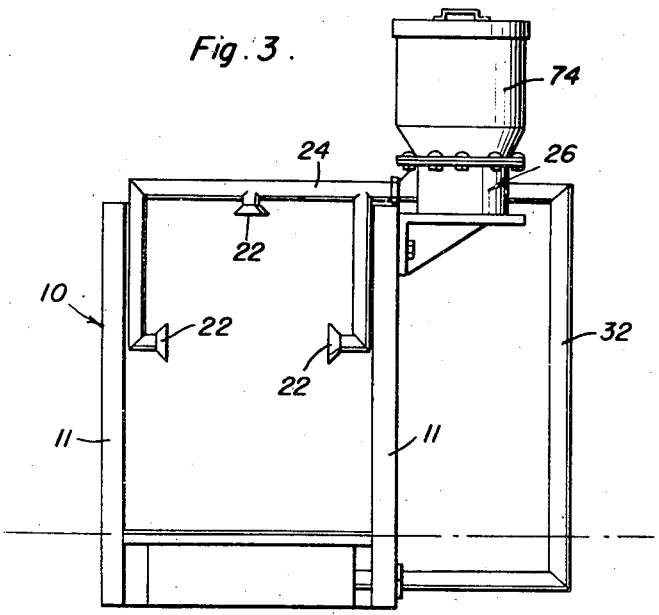

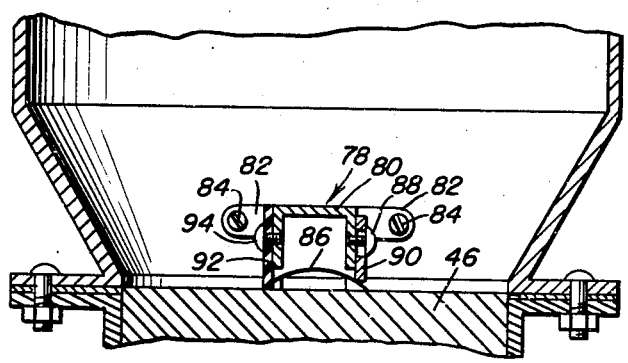
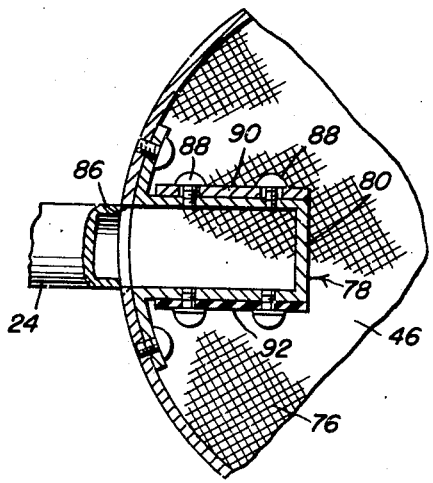
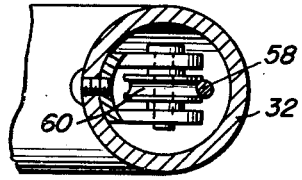
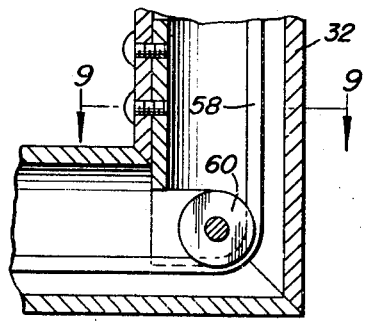
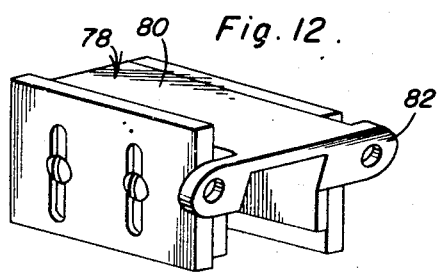
Alfred Paul, Jr.
INVENTOR.

Patented Aug. 30, 1949

2,480,601

UNITED STATES PATENT OFFICE 2,480,601

LIVESTOCK DUSTING APPARATUS

Alfred Paul, Jr., Paul Spur, Ariz.

Application January 5, 1948, Serial No. 579

2 Claims. (Cl. 119—159)

This invention relates to improvements in livestock dusting apparatus and has for its primary object to project against an animal jets of air ladened with a powdered insecticide.

Another object is to introduce into the air prior to its emission a predetermined amount of insecticide.

A further object is to utilize the weight of the animal as the source of energy by which the air blast is created.

The above and other objects may be attained by employing this invention which embodies among its features spaced opposed nozzles between which an animal to be treated is placed, a depressible treadle below the level of the nozzles and between their opposed ends, said treadle being adapted to be depressed by the weight of an animal passing between the nozzles, means actuated by the depression of the treadle to create an air blast, and means intermediate the air blast creating means and the nozzles for introducing an insecticidal dust into an air blast issuing from the nozzles.

Other features include metering means to regulate the volume of insecticidal dust introduced into the blast of air.

Still other features include a reservoir for the insecticidal dust, metering means carried by the reservoir for extracting a predetermined volume of insecticidal dust from the reservoir and introducing it into an air blast created by the depression of the treadle, and means actuated by the depression of the treadle to operate the metering means.

Figure 2:
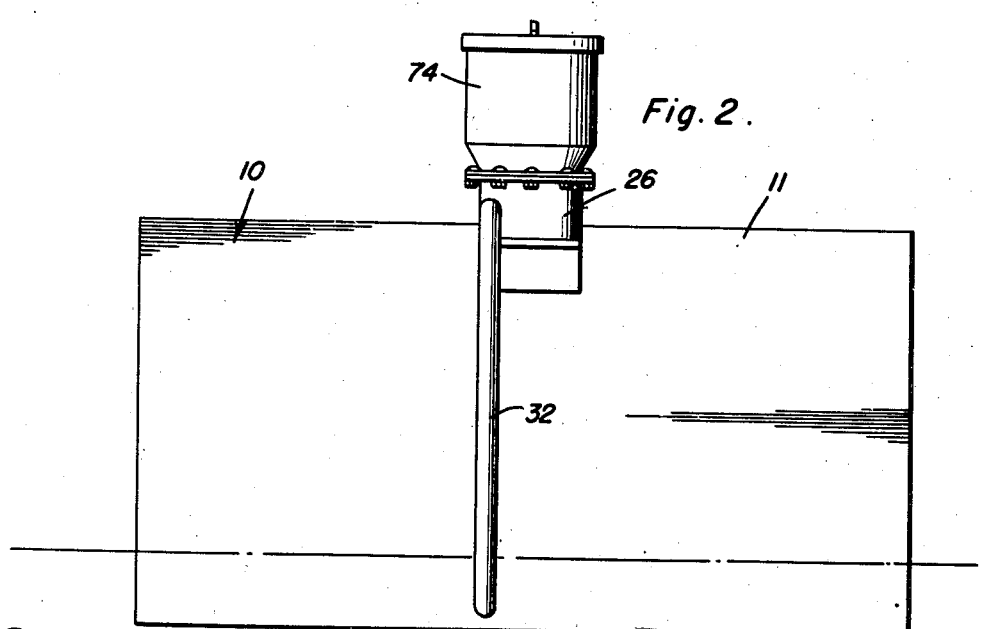
Figure 5:
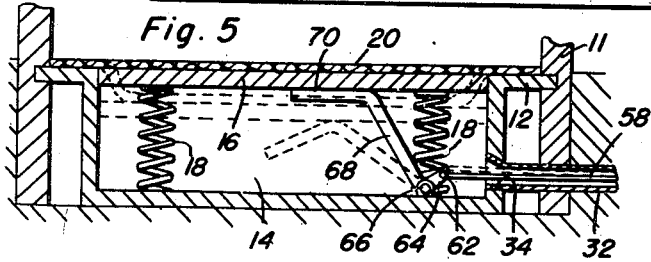

In the drawings:

Figure 1 is a top plan view of a livestock dusting unit embodying the features of this invention, Figure 2 is a side view of the dusting apparatus illustrated in Figure 1, Figure 3 is an end view of the apparatus illustrated in Figure 1, Figure 4 is an enlarged sectional view taken substantially along the line 4—4 of Figure 1, Figure 5 is a fragmentary enlarged sectional view taken substantially along the line 5—5 of Figure 1, Figure 6 is a top plan view of the reservoir and metering means, Figure 7 is a horizontal sectional view taken substantially along the line 7—7 of Figure 4, Figure 8 is a fragmentary enlarged detail sectional view through a portion of the conduit showing the metering means actuating cable therein, Figure 9 is a horizontal sectional view taken substantially along the line 9—9 of Figure 8, Figure 10 is an enlarged fragmentary sectional view taken substantially along the line 10—10 of Figure 6, Figure 11 is an enlarged fragmentary sectional view taken substantially along the line 11—11 of Figure 4, and Figure 12 is an enlarged perspective view of the adjustable measuring device for regulating the volume of insecticidal dust introduced into an air blast.

Referring to the drawings in detail a cattle chute designated generally 10 is equipped with side walls 11 and a bottom wall or floor 12. Formed beneath the floor or bottom wall 12 is a pit 14, and mounted for vertical sliding movement in the pit 14 is a treadle 16 which is yieldingly supported in an elevated position flush with the floor 12 on conventional compression coil springs 18, the effort of which is so adjusted as to enable the treadle 16 to be depressed under the weight of an animal driven through the chute. A suitable flexible covering 20 overlies the bore 12 and the treadle 16 which is adapted to flex under the weight of the animal with the downward movement of the treadle 16 and compress the air within the pit 14.

Supported in any suitable manner on the side walls 11 of the chute 10 are blast nozzles 22 which are coupled to a suitable conduit 24 one end of which opens into a metering device designated generally 26. This metering device is provided with a radial opening 28 into which the end of the conduit opens, and formed in the wall of the metering device, in spaced relation to the radial opening 28, is a tangential opening 30 into which one end of a blast conduit 32 opens. The opposite end of the blast conduit opens into an opening 34 in the side of the pit 14 so that as the treadle 16 is depressed, the air compressed within the pit will be ejected through the conduit 32 and into the metering device 26 as will be readily understood upon reference to Figures 5 and 7.

The metering device 26 comprises a substantially circular casing 36 having an open upper end surrounded by an outstanding attaching flange 38. Mounted on a suitable antifriction bearing 40 in the bottom of the casing 36 is a pedestal 42 carrying on its upper end an enlarged head 44 upon which a rotary table 46 is supported. As illustrated in Figure 4 the table 46 is of a diameter closely to fit the inner wall of the casing 36 and lie flush with the upper face of the flange 38. Depending from the table 46, and movable in unison therewith, is an annular flange 48 which is provided with an inwardly extending lug 50 against which one end of a compression coil spring 52 bears. The opposite end of the compression coil spring 52 bears against a fixed post 54 which projects upwardly from the bottom of the circular casing 36 to form an abutment for the coil spring. Attached as at 56 to the flange 48 is one end of a cable 58 which extends through the blast tube 32 over suitable guide rollers 60, and the end of the cable 58 remote from that coupled to the flange 48 is connected as at 62 to a lever arm 64 which is pivotally supported as at 66 in the bottom of the pit 14 to swing about an axis which lies perpendicular to the tube 32. An actuating arm 68 extends upwardly from the lever arm 64 and is provided with a suitable shoe 70 which bears against the under side of the treadle 16 as will be readily understood upon reference to Figure 5. It will thus be obvious that as the treadle 16 moves downwardly, pull will be exerted on the cable 58 to cause the flange 48 and table 46 to rotate against the effort of the spring 52 so that simultaneously with the creation of an air blast through the blast tube 32 the table 46 will be rotated.

Attached as by coupling bolt 72 to the flange 38 of the metering device 26 is a hopper 74 which serves as a storage receptacle for the insecticidal powder or dust. The table 46 forms the bottom of the hopper 74 and the surface upon which the insecticidal dust or power is supported is preferably knurled or roughened as at 76. As will be readily understood upon reference to the drawings, the hopper 74 is held against rotation by the bolts 72, and riveted or otherwise fixed to the wall of the hopper adjacent the lower end thereof is a measuring unit designated generally 78. This measuring device comprises a body 80 of substantially inverted U-shaped cross section having formed at one end outstanding attaching ears 82 which are pierced to receive attaching screws 84 by which the measuring unit is fixed to the wall of the hopper and held against rotation with the table 46. Formed in the wall of the hopper adjacent the end of the body 80 is a dust discharge opening 86 which opens into the conduit 24 adjacent its junction with the casing 36. Mounted for vertical adjustment as by screws 88 with relation to the lower edge of one leg of the U-shaped body 80 is a gauge plate 90 which cooperates with the knurled surface 76 of the table 46 in governing the amount of insecticidal powder or dust which enters the measuring unit 78 with the movement of the table. A suitable wiper 92 is fixed to the opposite leg of the U-shaped body 80 with its lower edge wiping against the upper surface of the table 46 to prevent the insecticidal dust or powder from moving with the table beyond the measuring unit 78. This wiper 92 is preferably of a suitable flexible material such as rubber or the like so that it may bear against the knurled surface 76 of the table 46 under yielding pressure. This wiper is removably supported as by screws 94 in order that should it become worn, replacement thereof may easily be effected.

In use the hopper 74 receives the insecticidal dust or powder which is supported on the movable table 46. When an animal is driven through the chute 10, its weight will depress the treadle 16 and cause the air compressed in the chamber 14 through the depression of the treadle to be expelled through the blast tube 32 and directed through the metering device 26, as suggested by the arrows in Figure 7 into the distributing tube 24 from whence it passes through the blast nozzles 22 and is directed against the animal standing on the treadle. Simultaneously with the depression of the treadle, the shoe 70 will be moved downwardly as suggested by the dotted lines in Figure 5 to cause the arm 68 to rock the rock arm 64 about the pivot 66 and exert pull on the cable 58. Such pull on the cable 58 will cause the table 46 to rotate against the effort of the spring 52 and thereby move a portion of the insecticidal dust or powder resting thereon beneath the lower edge of the plate 90 and into the measuring device 78. The air-blast passing through the metering device 26 and entering the tube 24 carries with it the insecticidal powder or dust lying on the table within the measuring device 78 so that as the dust laden air is ejected through the nozzles 22 it will be directed against the animal occupying the chute 10.

In this manner the weight of the animal is employed to actuate the mechanism by which the air-blast is created, and the air-blast passing the metering device and measuring unit will pick up the insecticidal powder so as to direct it against the animal. In this way the automatic treatment of animals may be accomplished without requiring the employment of extraneous power.

While in the foregoing there has been shown and described the preferred embodiment of this invention it is to be understood that minor changes in the details of construction, combination and arrangement of parts may be resorted to without departing from the spirit and scope of the invention as claimed.

Having described the invention, what is claimed as new is:

1. Apparatus for projecting insecticidal dust onto an animal which includes spaced opposed nozzles between which an animal to be treated is placed, a depressible treadle below the level of the nozzles and between their opposed ends, said treadle being adapted to be depressed by the weight of an animal passing between the nozzles, means actuated by the depression of the treadle to create an air blast, a conduit connected to the air blast creating means and to the nozzles to conduct an air blast so created to the nozzles, a reservoir for insecticidal dust, metering means carried by the reservoir and connected to the conduit for extracting a predetermined volume of insecticidal dust from the reservoir and introducing it into the conduit and mechanical means connected to the treadle and to the metering means for actuating said metering means upon the depression of the treadle.

2. In animal dusting apparatus of the type comprising a nozzle before which an animal to be dusted stands, a depressible treadle adjacent the nozzle and below the level thereof on which stands the animal to be dusted, means beneath the treadle and actuated thereby to create an air blast, and a conduit connected to the air blast creating means and the nozzle to direct the air blast through the nozzle, means to introduce into the air blast as it passes through the conduit a predetermined volume of insecticidal dust, said last-named means comprising a reservoir containing insecticidal dust, a disk mounted in the reservoir to rotate about a vertical axis adjacent the lower end thereof, a casing surrounding the disk and opening into the conduit, means connected to the disk and to the treadle to impart partial rotation to the disk each time the treadle is depressed and a wiper fixed within the reservoir adjacent the periphery of the disk to engage the top surface of the disk and wipe a predetermined volume of insecticidal dust from the top surface of the disk and discharge it into the conduit when the disk is moved by the depression of the treadle.

ALFRED PAUL, JR.

REFERENCES CITED

The following references are of record in the file of this patent:

UNITED STATES PATENTS

| Number | Name | Date |
|---|---|---|
| 1,113,180 | Andrews | Oct. 13, 1914 |
| 1,303,851 | Carlson | May 20, 1919 |
| 1,505,641 | Hendrickson | Aug. 19, 1924 |
| 1,576,046 | Guthrie | Mar. 9, 1926 |
| 2,238,872 | Mather et al. | Apr. 15, 1941 |